United States Patent [19]

Harreither

[11] Patent Number: 5,044,491
[45] Date of Patent: Sep. 3, 1991

[54] SUPPORT ROLL FOR BELT CONVEYORS, PROCESSING CONVEYORS AND PRESSES, ESPECIALLY DOUBLE-BELT PRESSES

[75] Inventor: Rupert Harreither, Baden, Austria

[73] Assignee: Austria Metall Aktiengesellschaft, Braunau, Austria

[21] Appl. No.: 413,527

[22] Filed: Sep. 27, 1989

[30] Foreign Application Priority Data

Sep. 27, 1988 [AT] Austria .................................. 2376/88

[51] Int. Cl.⁵ .............................................. B65G 39/10
[52] U.S. Cl. ...................................... 198/842; 384/418
[58] Field of Search ................ 198/842, 780; 384/110, 384/418, 419, 546

[56] References Cited

U.S. PATENT DOCUMENTS

| | | | |
|---|---|---|---|
| 1,273,909 | 7/1918 | O'Connor | 384/418 |
| 2,072,448 | 3/1937 | Hamill . | |
| 2,452,266 | 10/1948 | Scharff . | |
| 3,161,125 | 12/1964 | Hornbostel | 198/780 X |
| 3,669,243 | 6/1972 | Fischbacher | 198/780 |
| 4,790,421 | 12/1988 | Gorges | 198/780 X |

FOREIGN PATENT DOCUMENTS

| | | |
|---|---|---|
| 9823 | 11/1902 | Austria . |
| 122933 | 10/1900 | Fed. Rep. of Germany . |
| 1218342 | 2/1966 | Fed. Rep. of Germany . |
| 1810941 | 6/1970 | Fed. Rep. of Germany . |
| 2133672 | 1/1973 | Fed. Rep. of Germany . |
| 2458181 | 6/1976 | Fed. Rep. of Germany . |
| 3427707 | 2/1986 | Fed. Rep. of Germany . |

Primary Examiner—Joseph E. Valenza
Assistant Examiner—Keith L. Dixon
Attorney, Agent, or Firm—Herbert Dubno

[57] ABSTRACT

A support roll for a belt press, transport conveyor or processing conveyor has a support tube mounted upon a support shaft whose ends project beyond the support tube and are provided with bearings for journaling the roll on the machine. Within the support tube, a bearing of protuberances on the tube or the shaft brace the tube against the shaft at two axially-spaced locations so that deformations of the tube tend to be transmitted to the shaft and the shaft remains largely undeformed by loading and thermal processes.

5 Claims, 3 Drawing Sheets

SUPPORT ROLL FOR BELT CONVEYORS, PROCESSING CONVEYORS AND PRESSES, ESPECIALLY DOUBLE-BELT PRESSES

CROSS REFERENCE TO RELATED APPLICATION

This application is related to the commonly assigned concurrently filed copending application Ser. No. 07/413,529.

FIELD OF THE INVENTION

My present invention relates to a support roll for a transport belt, a processing belt or some other conveyor belt of a belt conveyor, or for a press which can utilize belts or in which the support roll supports the material to be pressed directly. Specifically the invention relates to a support roll for a double-belt press.

BACKGROUND OF THE INVENTION

Support rolls cooperating with belts or disposed in an array to support products for transport, processing or pressing, may be required to take up considerable loads.

For those cases in which a bending of the support roll is to be avoided or in which it is important to prevent even very small bendings in relation to the thickness of the transported goods and under the combined effects of pressure, loading and temperature in a transport system or press, various techniques must be employed. Such techniques are particularly important when practically zero support roll bending is permissible if a predetermined geometry of a product is to be maintained.

An obvious way of limiting the bending of a transport and roll is to increase its cross section. This, however, is not always possible, since the outer dimensions of the roll may be limited.

Another approach is to brace the support roll by additional rolls engaging the support roll from the outside. The latter technique cannot be employed in extreme heat environments or other cases in which effective lubrication cannot be ensured.

It is also a common practice to increase the resistance to bending of a support roll to minimize bending in the contact region of the support roll with the conveyor belt, by especially shaping the support roll or the support tube which forms that roll.

One of the problems with all of these earlier systems is that the support roll is generally subjected to significant temperature changes and extremes of temperature which create a variety of problems, even apart from the lubrication problem mentioned above, with respect to binding or seizing of the support roll or dimensional changes.

The variations in heating and cooling thus require a variety of expensive and frequently unreliable techniques for ensuring the original form of the support roll and to minimize the bending.

OBJECTS OF THE INVENTION

It is, therefore, the principal object of this invention to provide a support roll for the purposes described which will suffer minimum bending under load and even under thermal stress, e.g. extremes of temperature or temperature variation and, specifically with heating and cooling.

Another object of this invention is to provide a support roll for the purposes described and especially for a double-belt press which is free from drawbacks of earlier systems.

SUMMARY OF THE INVENTION

These objects and others which will become apparent hereinafter are attained, in accordance with this invention, in a support roll for the purposes described which comprises a support tube and a support shaft extending coaxially through the support tube and, advantageously, continuously through the latter and forming on one or both of the tube and the shaft radial projections which extend toward the other and are braced thereon at more than one axially-spaced location within the interior of the tube.

Thus, according to one aspect of the invention, the inner wall of the tube can be formed with two protuberances which are braced upon the outer periphery of the shaft. Conversely the outer wall of the shaft can be provided with two axially-spaced protuberances which engage upon the inner wall of the support tube. The support shaft can have its ends projecting outwardly beyond the ends of the support tube to be journaled rotatably in the machine.

The positions or spacings of the two protuberances can be so selected that the bending of the support tube is held to a minimum. The support tube is thus supported in turn by the support shaft so that the load is taken up by the latter but such that any deformation of the support shaft will not result in a significant deformation of the support tube itself, by reason of the concentration of the force-transfer points at two spaced-apart locations.

The fit between the support tube and the support shaft is so selected that even upon the development of pressure differences therebetween, one will not seize the other and binding of the two will not occur.

The practical configuration of the two support locations for the support tube can have a variety of configurations which will be influenced by the load to be transferred and the heat transfer Essentially, heat conductivity and support can be optimized in various ways. For example, it is possible to provide the support formations so that the protuberances are not continuous but rather are interrupted or so that the space between the support tube and the support shaft are bridged by pins.

According to a further feature of the invention, the protuberances are formed on the support shaft and are s profiled that they mesh with complementary profiling on the inner wall of the support tube. The interengagement of the inner wall of the support tube and protuberances on the shaft can provide a simple axial guide securing the support tube on the shaft against axial shifting.

Furthermore, one of the two circumferential protuberances of the support shaft can be coupled axially nonshiftably with the support tube so that it forms a fixed bearing point. The other protuberance can simply engage a surface of the support tube so as to allow relative axial movement of the support tube and support shaft. This, of course, permits axial yieldability and prevents binding of the support tube on the support shaft.

A further embodiment of the invention has the protuberances each formed as ring segments which can engage in annular profile portions of the support tube and can be fitted between flanges or shoulders of the support shaft.

In this manner a simple but reliable mounting of the support tube on the support shaft without axial shifting between shaft and tube is possible.

The mounting is facilitated in an especially simple manner when the support tube has a circumferential groove in which the segments are engaged and a radial opening to allow the segments to be inserted from the exterior The opening can then be closed by welding or pressing a closing member into that opening.

In order to compensate for deformation of the support shaft by shifting of the support tube, it is advantageous to mount the bearings of the support shaft so that they are shiftable in the direction of tube deformation.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 6:
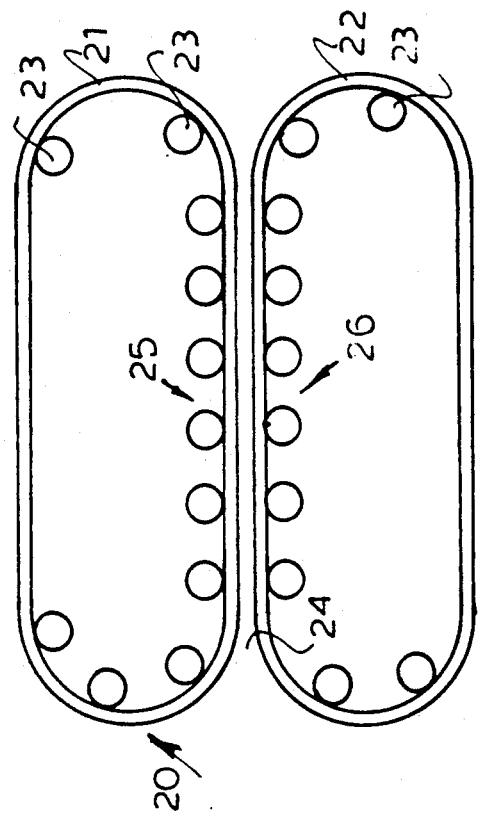
FIG. 6 is a diagram showing the application of the support rolls to a double-belt press according to the invention.

Referring first to FIG. 6, it can be seen that a double-belt press 20 comprises a pair of belts 21 and 22 which are displaceable on rollers 23. The belts define a pressing gap 24 between two arrays of support rolls 25 and 26 which can be constituted by the roll systems of the present invention. The press frame has not been illustrated here nor have I shown the means for adjusting the roll gap which can be of the type described in the aforementioned copending application.

Figure 1:
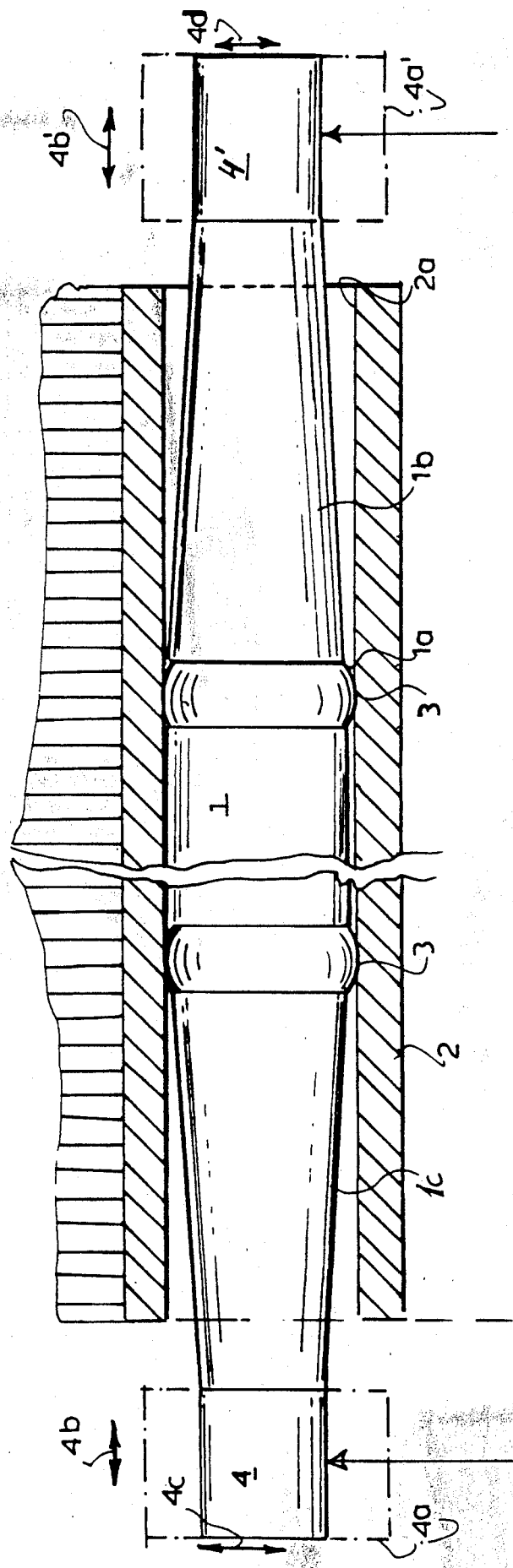
FIG. 1 is an axial section through the construction of the present invention.

The support roll of FIG. 1, for example, comprises a support shaft 1 which has a central region 1a which is cylindrical, flanked by two protuberances or bulges 3 braced against the inner wall 2a of a cylindrical tube 2 forming the support tube.

Extending outwardly from these protuberances in opposite axial directions are frustoconical or tapered regions 1b and 1c of the shaft, terminating in shaft stubs 4 and 4' which are journaled in bearings 4a and 4a' respectively.

As is apparent from the arrows 4b and 4b', the bearings 4a and 4a' are mounted to allow some axial mobility, e.g. under thermal stress, while the arrows 4c and 4c' represent some radial mobility to compensate for deformation or shifting of the support shaft by way of compensation for a shifting or distortion of the tube 2.

The support shaft 1 is disposed concentrically in the support tube 2 and thus has its two circumferential protuberances 3 spaced axially apart within the support tube 2 and located inwardly of the ends thereof.

Figure 5:
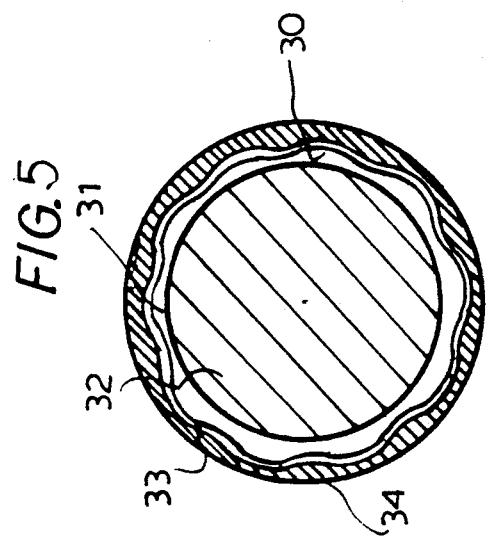
FIG. 5 is a cross-sectional view illustrating another embodiment.

As can be seen from FIG. 5, the protuberances which are to be continuous and of uniform circumferential configuration as in FIG. 1, can have spaced-apart teeth 30 on the protuberance 31 of the shaft 32 and these protuberances can mesh with projections or bulges 33 of the support tube 34 if desired.

Figure 2:
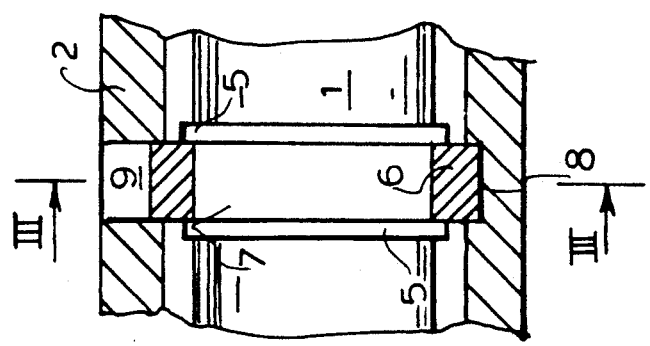
FIG. 2 is a detail of one of the load-transmitting regions provided with circular segments.

In the embodiment of FIG. 2, the bracing of the support tube member 2 against the support shaft 1 is effected by means of ring segments 6 which collectively form a protuberance on the support shaft. The ring segments 6 (see also FIG. 3) are disposed in a groove 7 formed between a pair of shoulders or flanges 5 of the support shaft 1 and extend into the annular profiling or groove 8 of the support shaft 1.

This arrangement fixes the shaft 1 to the tube member 2 axially in the region of this protuberance and the other protuberance can be of the type shown in FIG. 1 in which it is engaged by a cylindrical surface of the tube member so that axial expansion and contraction of the tube member is possible without transferring force to the shaft 1.

Outwardly of the annular groove 8 and opening at the outer surface of the shaft 2 is a closable opening 9 through which the ring segments 6 can be inserted.

Upon relative rotation of the shaft and the tube, the segments can be inserted one after the other and the opening 9 then closed by welding or by force-fitting a suitably shaped pin into this opening.

Figure 3:
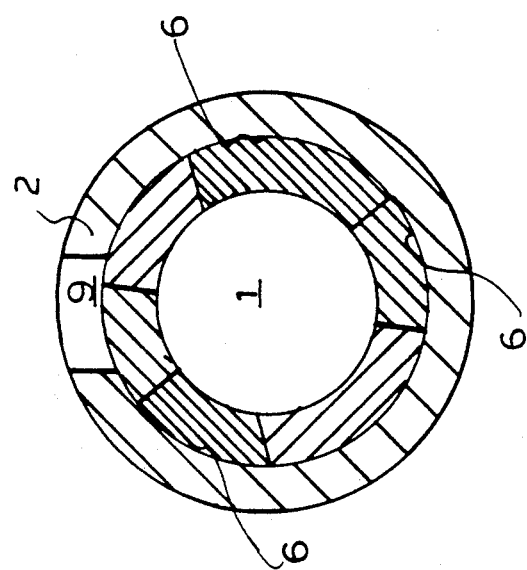
FIG. 3 is a section taken along the line III—III of FIG. 2.

If desired the second protuberance need not freely engage the tube member 2 but can be axially coupled thereto as is the case with the protuberance shown in FIGS. 2 and 3.

Figure 4:
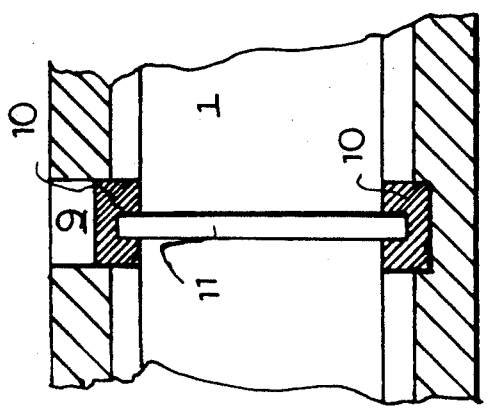
FIG. 4 is a detail of another arrangement utilizing circular segments.

FIG. 4 shows a variant of the bracing protuberances in which the circular segments 10 are themselves grooved with their grooves being seated on an annular ridge 11 of the support shaft 1. These segments of the protuberance can be mounted in the manner described in FIG. 2.

The invention, of course, encompasses not only the specific structure shown and described but also of variants and modifications which are to be considered within the spirit and scope of the appended claims.

I claim:

1. A support roll for a transport belt, press belt or process belt, especially for a press belt of a double-belt press, comprising:
   a support tube having an outer surface engageable with a belt and supported other than at opposite ends of said tube;
   a support shaft concentric with said tube and extending continuously therethrough, said shaft having opposite axial ends projecting from and beyond said opposite ends of said tube;
   bearings at said opposite axial ends of said support shaft journaling said shaft and supporting the support shaft; and
   two circumferential protuberances formed on said support shaft and bearing radially upon said support tube spaced inwardly from ends of said tube and spaced apart from one another for supporting said tube against bending, one of said protuberances being coupled axially with said tube member, each of said protuberances being formed by a plurality of ring segments on said shaft.

2. The support roll defined in claim 1 wherein said protuberances are shaped to mesh with profiling formed on said inner surface of said tube member.

3. The support roll defined in claim 1, wherein said inner surface of said tube member is formed with grooves receiving said tube segments.

4. The support roll defined in claim 1 wherein at least one of said bearings is shaftable in a direction corresponding to a direction of deformation of said tube member.

5. A support roll for a transport belt, press belt or process belt, especially for a press belt of a double-belt press, comprising:
- a support tube having an outer surface engageable with a belt and unsupported at opposite ends;
- a support shaft concentric with said tube and extending continuously therethrough, said shaft having opposite axial ends projecting from and beyond the unsupported opposite ends of said tube;
- bearings at said opposite axial ends of said support shaft journaling said shaft and supporting the support shaft; and
- two circumferential protuberances formed on said support shaft and bearing radially upon said support tube spaced inwardly from ends of said tube and spaced apart from one another for supporting said tube against bending, said tube member being formed with a closable opening enabling insertion of said ring segments.

* * * * *